(12) United States Patent
Misumi

(10) Patent No.: US 7,193,386 B2
(45) Date of Patent: Mar. 20, 2007

(54) APPARATUS AND METHOD FOR DRIVING A STEPPING MOTOR

(75) Inventor: Hiroyoshi Misumi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 248 days.

(21) Appl. No.: 10/448,491

(22) Filed: May 29, 2003

(65) Prior Publication Data

US 2003/0227273 A1    Dec. 11, 2003

(30) Foreign Application Priority Data

Jun. 5, 2002    (JP)    ............................. 2002-164578

(51) Int. Cl.
*H02P 8/00*    (2006.01)
(52) U.S. Cl. .................. 318/696; 318/685; 318/254
(58) Field of Classification Search ................ 318/696, 318/685, 254, 687; 310/49 R
See application file for complete search history.

(56) References Cited

U.S. PATENT DOCUMENTS

| | | | | |
|---|---|---|---|---|
| 4,558,268 A | * | 12/1985 | Besson et al. | ............... 318/696 |
| 4,684,262 A | * | 8/1987 | Meister | ....................... 368/157 |
| 4,760,320 A | * | 7/1988 | Tsugita | ....................... 318/696 |
| 4,855,629 A | * | 8/1989 | Sato | ............................ 310/49 R |
| 5,216,347 A | * | 6/1993 | Pace et al. | ................... 318/696 |
| 5,446,361 A | * | 8/1995 | Van Der Broeck | ......... 318/747 |
| 5,847,524 A | * | 12/1998 | Erdman et al. | ............... 318/439 |
| 6,114,782 A | * | 9/2000 | Lin et al. | ................... 310/49 R |
| 6,246,205 B1 | * | 6/2001 | Kujira et al. | ................ 318/685 |
| 6,271,638 B1 | * | 8/2001 | Erdman et al. | ............... 318/439 |
| 6,307,345 B1 | * | 10/2001 | Lewis | .......................... 318/696 |
| 6,731,093 B1 | * | 5/2004 | Kalmbach | .................... 318/696 |
| 6,850,028 B2 | * | 2/2005 | Yoshihisa et al. | ............ 318/696 |

FOREIGN PATENT DOCUMENTS

| | | |
|---|---|---|
| JP | 55-143697 | 10/1980 |
| JP | 62-004898 | 1/1987 |
| JP | 03-284192 | 12/1991 |
| JP | 2003-284192 | 10/2003 |

* cited by examiner

*Primary Examiner*—Lincoln Donovan
*Assistant Examiner*—Renata McCloud
(74) *Attorney, Agent, or Firm*—Cowan, Liebowitz & Latman, P.C.

(57) ABSTRACT

The present invention relates to an apparatus for driving a stepping motor, including a plurality of push-pull circuits each of which is capable of controlling a push state in which a current is supplied to a terminal and a pull state in which a current is drawn through the terminal and which are connected to coils to operate the stepping motor utilizing the bipolar driving. In the apparatus of the present invention, at least one of the push-pull circuits is connected to a common terminal having one ends of the coils of different phases connected thereto, thereby reducing the number of circuits and driving lines.

2 Claims, 8 Drawing Sheets

APPARATUS AND METHOD FOR DRIVING A STEPPING MOTOR

BACKGROUND OF THE INVENTION

1. Field of the Invention

The present invention relates to an apparatus and method for driving a stepping motor.

2. Related Background Art

FIG. 9 is a block diagram, partly in circuit diagram, showing a configuration of a conventional apparatus for driving a two-phase stepping motor by utilizing the bipolar driving. In the figure, reference numeral 110 designates a two-phase stepping motor which includes, in its inside, a coil LA101 of a phase A, a coil LB102 of a phase B, and a magnetized rotor 103. Reference symbols 120A+, 120A−, 120B+ and 120B− designate half bridge circuits, respectively. Then, there are provided a pair of half bridge circuits for the phase A coil LA101, and a pair of half bridge circuits for the phase B coil LB102, i.e., four half bridge circuits in total. Reference numeral 130 designates a control circuit for controlling a driving signal for the half bridge circuits 120A+ and 120A−, and a driving signal for the half bridge circuits 120B+ and 120B−.

Each of the half bridge circuits 120A+, 120A−, 120B+ and 120B− is a push-pull circuit. The push-pull circuit is changed between a state in which a current is caused to flow out to a terminal (push state) and a state in which a current is pulled through the terminal (pull state) in accordance with a control signal issued from the control circuit 130. Then, the four half bridge circuits 120A+, 120A−, 120B+ and 120B− are changed successively between the push state and the pull state, whereby the poles of the phase A and the phase B are changed over to each other to rotate the rotor 103 stepwise.

In the case of the above-mentioned prior art, four half bridge circuits are required in total, and hence four driving lines to be connected to the coils are also required in total. Then, a large number of two-phase stepping motors utilizing the bipolar driving may be used depending on the apparatuses in some cases, and hence a simple increase in number of half bridge circuits and number of driving lines exerts an influence on the shape, the design and the like of the apparatus.

SUMMARY OF THE INVENTION

One of the features of the present invention relates to an apparatus and a method for driving a stepping motor, including a plurality of push-pull circuits each of which is capable of controlling a push state in which a current is supplied to a terminal and a pull state in which a current is drawn through the terminal and which are connected to coils to operate the stepping motor utilizing the bipolar driving. In the apparatus and method for driving the stepping motor, at least one of the push-pull circuits is connected to a common terminal having one ends of the coils of different phases connected thereto.

A push state and a pull state of the common terminal are alternately changed over to each other, and a push state and a pull state of each of the push-pull circuits connected to the other ends of the coils are arbitrarily changed over to each other, whereby it is possible to control driving operation for the stepping motor using driving lines which are fewer than those of the prior art.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

A first embodiment of the present invention will hereinafter be described in detail with reference to the accompanying drawings.

Figure 1:
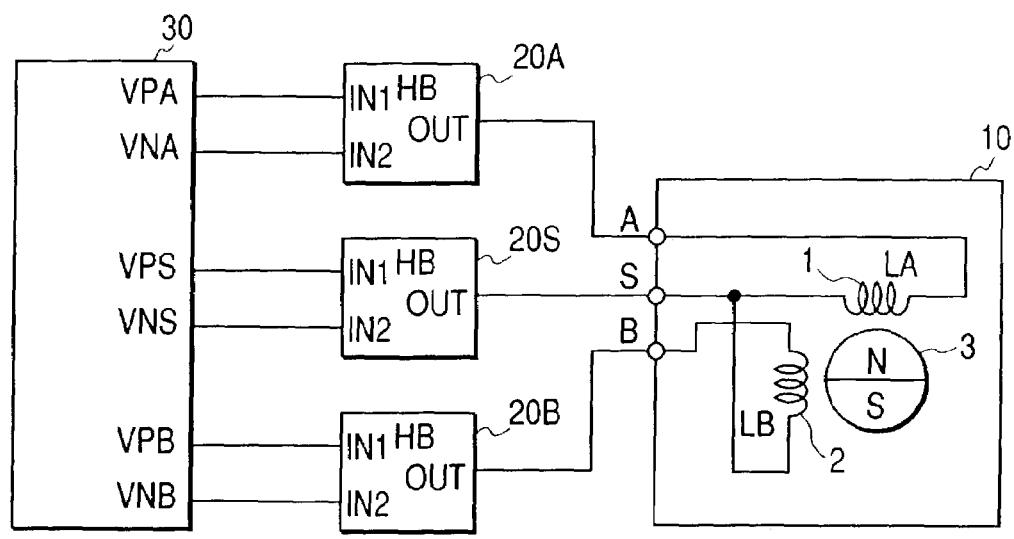
FIG. 1 is a block diagram, partly in circuit diagram, showing a configuration of an apparatus for driving a stepping motor by utilizing bipolar driving.

FIG. 1 is a block diagram, partly in circuit diagram, showing a configuration of a driving apparatus for a stepping motor according to a first embodiment of the present invention. In the figure, reference numeral 10 designates a two-phase stepping motor which includes, in its inside, a coil LA1 of a phase A and a coil LB2 of a phase B whose one ends are operatively connected to each other, and a magnetized rotor 3. Note that, this figure is illustrated for simplification, and hence the number of magnetic poles of the rotor 3 is, of course, not limited to two. Reference symbols 20A, 20S, and 20B designate half bridge circuits, respectively. The half bridge circuit 20A is operatively connected to a terminal A of the phase A coil LA1, the half bridge circuit 20B is operatively connected to a terminal B of the phase B coil LB2, and the half bridge circuit 20S is operatively connected to a common terminal S to which both the phase A coil LA1 and the phase B coil LB2 are operatively connected. As described above, three half bridge circuits are provided in total per stepping motor. It is sufficient in terms of the function of the apparatus that the number of half bridge circuits is larger than the number of phases of the stepping motor by one. Reference numeral 30 designates a control circuit for controlling driving signals of the half bridge circuits 20A, 20S, and 20B, respectively.

The half bridge circuit 20A is a push-pull circuit which can select three states: a (source) state in which a current is supplied through a terminal OUT in accordance with signals inputted to input terminals IN1 and IN2, respectively (hereinafter referred to as "a push state"); a state in which a current is drawn sink state in accordance therewith (hereinafter referred to as "a pull state"); and an open state in which the terminal OUT becomes a floating state not to cause a current to flow. The control circuit 30 controls signals outputted through terminals VPA and VNA to select among the three states of the half bridge circuit 20A to thereby control the driving of the stepping motor 10. Likewise, the half bridge circuit 20B is controlled in accordance with signals outputted through terminals VPB and VNB of the control circuit 30, and the half bridge circuit 20S is controlled in accordance with signals through terminals VPS and VNS of the control circuit 30.

Next, a description will hereinbelow be given with respect to currents caused to flow through each of the coils with reference to FIGS. 2 and 3.

Figure 2:
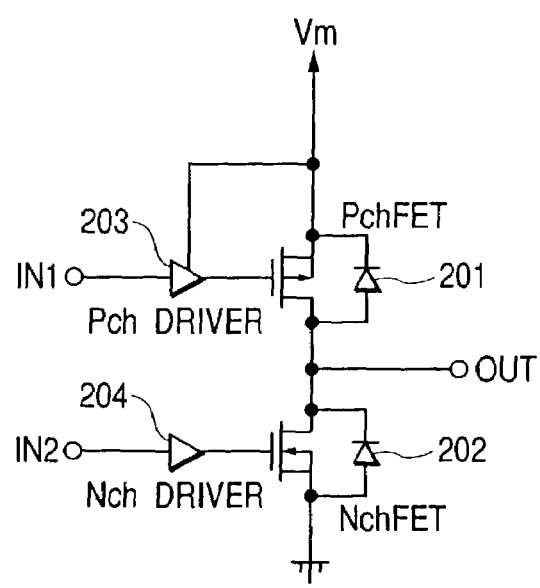
FIG. 2 is a circuit diagram showing a configuration of a half bridge circuit.

FIG. 2 is a circuit diagram showing a configuration of each of the half bridge circuits, 20A, 20S, and 20B. In the figure, reference numeral 201 designates a P-channel FET element, reference numeral 202 designates an N-channel FET element, reference numeral 203 designates a P-channel driver for driving the P-channel FET 201, and reference numeral 204 designates an N-channel driver for driving the N-channel FET 202.

Figure 3:
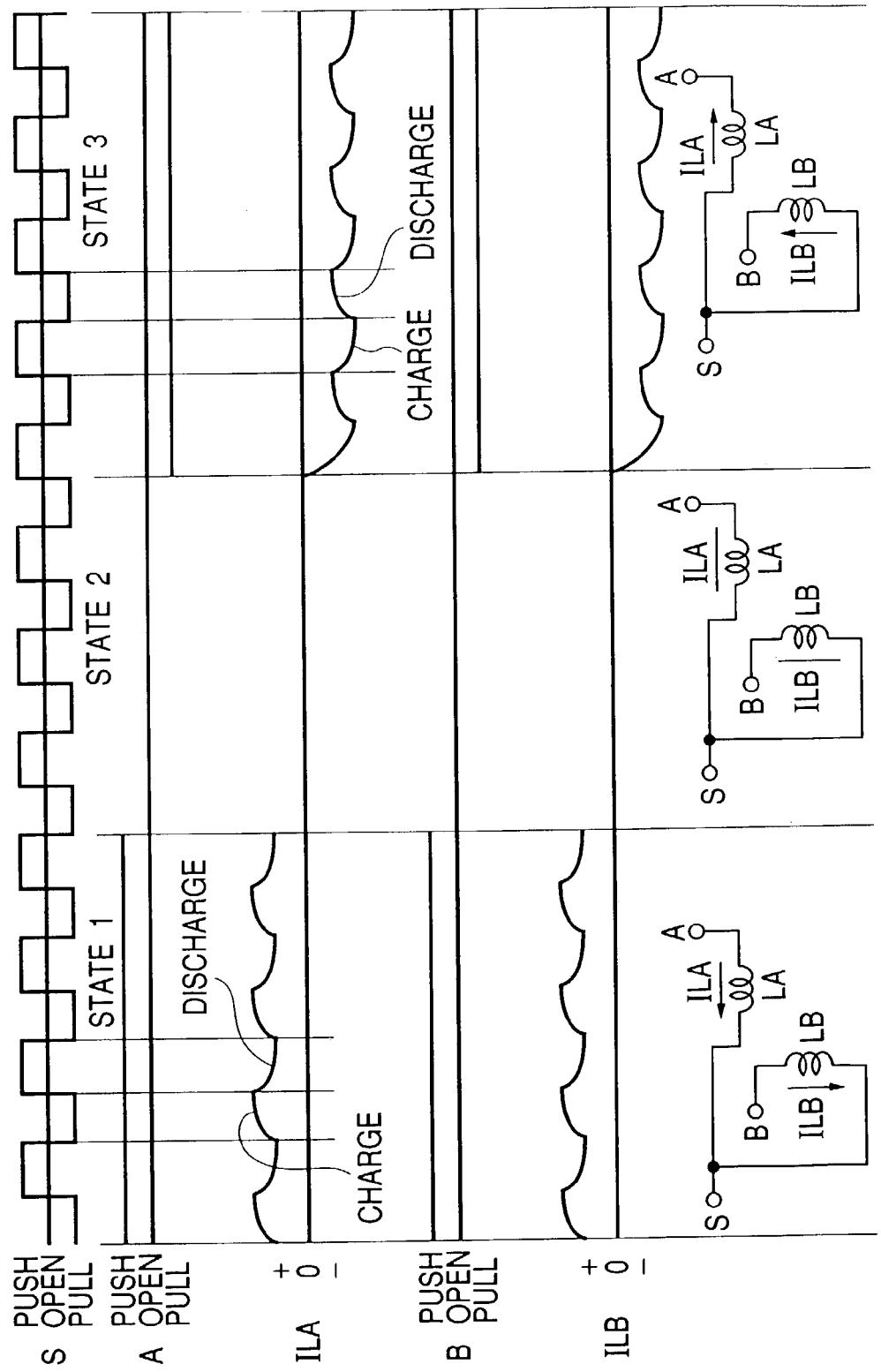
FIG. 3 is a diagram useful in explaining states of the half bridge circuit and currents caused to flow through coils.

FIG. 3 is a timing chart useful in explaining states of the terminals OUT of the half bridge circuits 20A, 20S, and 20B, and a circuit diagram showing states of currents caused to flow through each of the coils.

Here, a state of the common terminal S is usually controlled by the control circuit 30 so that pulses are generated in which the ratio of a period of the push state to a period of the pull state is 1:1, and a frequency thereof is fixed to about several tens kHz, which is higher than an auditory range.

Here, the currents caused to flow through the coil LA1 and the coil LB2 are assumed to be ILA and ILB, respectively.

During a period of time of (state 1), the terminal A is fixed to the push state. When the common terminal S is held in the pull state, the current ILA is drawn from the terminal A to the common terminal S through the coil LA1. Since when the common terminal S is in the push state, both the terminal A and the common terminal S are in the push state, the P-channel FETs 201 of the half bridge circuits 20A and 20S are turned ON to form a loop in which both ends of the coil LA1 are shorted. Hence, a discharge current is caused to slowly flow to provide an effect of holding the current. Thus, when the common terminal S is in the pull state, charging is carried out, while when the common terminal S is in the push state, discharging is carried out. If a period of time when the terminal A is held in the push state is much longer than a push/pull period of the common terminal S, then a charge current and a discharge current are alternately and repeatedly caused to flow through the coil LA1 as shown in FIG. 3 so that a fixed current which is roughly balanced due to these characteristics is caused to flow through the coil LA1. This is also applied to the coil LB2. Thus, the terminal B is fixed to the push state, whereby a charge current and a discharge current are alternately and repeatedly caused to flow through the coil LB2 so that a fixed current which is roughly balanced due to these characteristics is caused to flow through the coil LB2.

During a period of time of (state 2), both the terminals A and B are fixed to the open state. As a result, no current is caused to flow through coils LA1 and LB2.

During a period of time of (state 3), the terminal A is fixed to the pull state. When the common terminal S is held in the push state, the current ILA is drawn from the terminal S to the terminal A through the coil LA1. Since when the common terminal S is held in the pull state, both the terminal A and the common terminal S are in the pull state, the N-channel FETs 202 of the half bridge circuits 20A and 20S are turned ON to form a loop in which the both ends of the coil LA1 are shorted. Hence, a discharge current is caused to slowly flow to provide the effect of holding the current. Thus, when the common terminal S is in the push state, the charging is carried out, while when the common terminal S is in the pull state, the discharging is carried out. If a period of time when the terminal A is held in the pull state is much longer than a push/pull period of the common terminal S, then the charge current and the discharge current are alternately and repeatedly caused to flow through the coil LA1 as shown in FIG. 3 so that the fixed current which is roughly balanced due to these characteristics is caused to flow through the coil LA1. This is also applied to the coil LB2. Thus, the terminal B is fixed to the pull state, whereby charge current and the discharge current are alternately and repeatedly caused to flow through the coil LB2 so that the fixed current which is roughly balanced due to these characteristics is caused to flow though the coil LB2.

As described above, the state of the common terminal S is usually controlled by the control circuit 3 so that pulses are generated in which the ratio of a period of the push state to a period of the pull stare is 1:1 to put the three states of the push state, the pull state and the open state to proper use for the terminals A and B, whereby directions or amounts of currents caused to flow through the coils LA1 and LB2, respectively, can be controlled independently with each other.

Since one end of the coil LA1 and one end of the coil LB2 may be operatively connected to the common terminal S, in the case of a two-phase stepping motor, only three half bridge circuits and three driving lines are sufficient.

Figure 4:
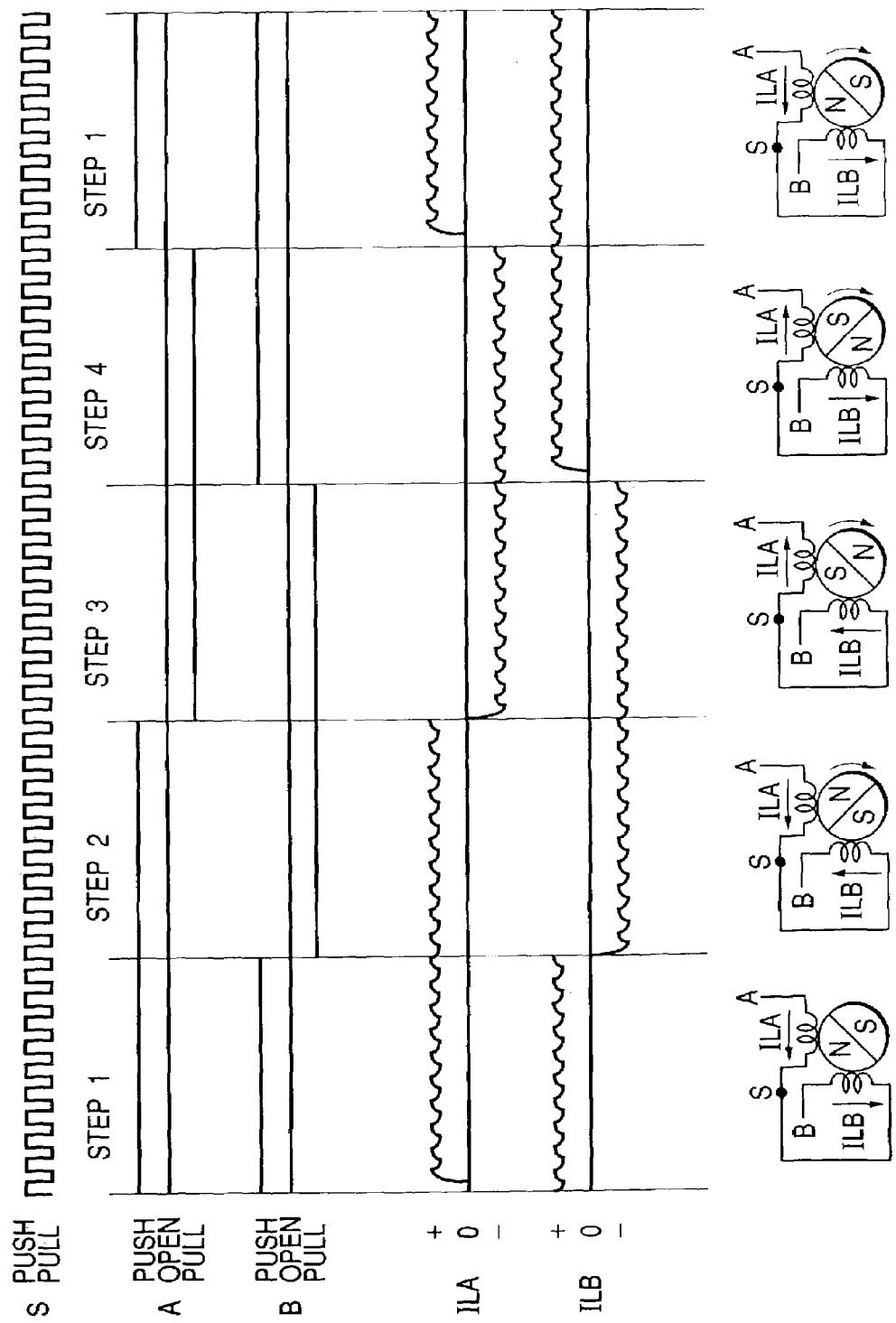
FIG. 4 is a diagram useful in explaining states of a half bridge circuit for driving a stepping motor with two-phase excitation.

FIG. 4 is a diagram showing states of the half bridge circuit for two-phase excitation driving. Similarly to FIG. 3, the state of the common terminal S is controlled so that the ratio of a period of the push state to a period of the pull state becomes 1:1.

During a period of time of (step 1), both the terminals A and B are made held in the push state, and as described in FIG. 3, a current is caused to flow from the terminal A towards the common terminal S through the coil LA1, and a current is caused to flow from the terminal B towards the common terminal S through the coil LB2. Since both a yoke connected to the coil LA1 and a yoke connected to the coil LB2 are excited to the S pole, the rotor is rotated so that the N pole of the rotor is moved to the position facing both the yoke connected to the coil LA1 and the yoke connected to the coil LB2.

During a period of time of (step 2), the state of the terminal B is changed over to the pull state, whereby the current being caused to flow through the coil LB2 is inverted to excite the yoke connected to the coil LB2 to the N pole. Then, the rotor is rotated in a clockwise direction so that the N pole of the rotor faces the yoke connected to the coil LA1, and the S pole thereof faces the yoke connected to the coil LB2.

During a period of time of (step 3), the state of the terminal A is changed over to the pull state, whereby the current being caused to flow through the coil LA1 is inverted to excite the yoke connected to the coil LA1 to the N pole. Then, the rotor is rotated in a clockwise direction so that the S pole of the rotor faces both the yoke connected to the coil LA1 and the yoke connected to the coil LB2.

During a period of time of (step 4), the state of the terminal B is changed over to the push state, whereby the current being caused to flow through the coil LB2 is inverted to excite the yoke connected to the coil LB2 to the S pole. Then, the rotor is rotated in a clockwise direction so that the S pole of the rotor faces the yoke connected to the coil LA1, and the N pole thereof faces the yoke connected to the coil LB2.

Then, the state of the terminal A is changed over to the push state again to return the operation back to (step 1).

In such a manner, the push and pull states of the terminals A and B are alternately changed over, and this operation is repeatedly carried out to perform the two-phase excitation driving.

Figure 5:
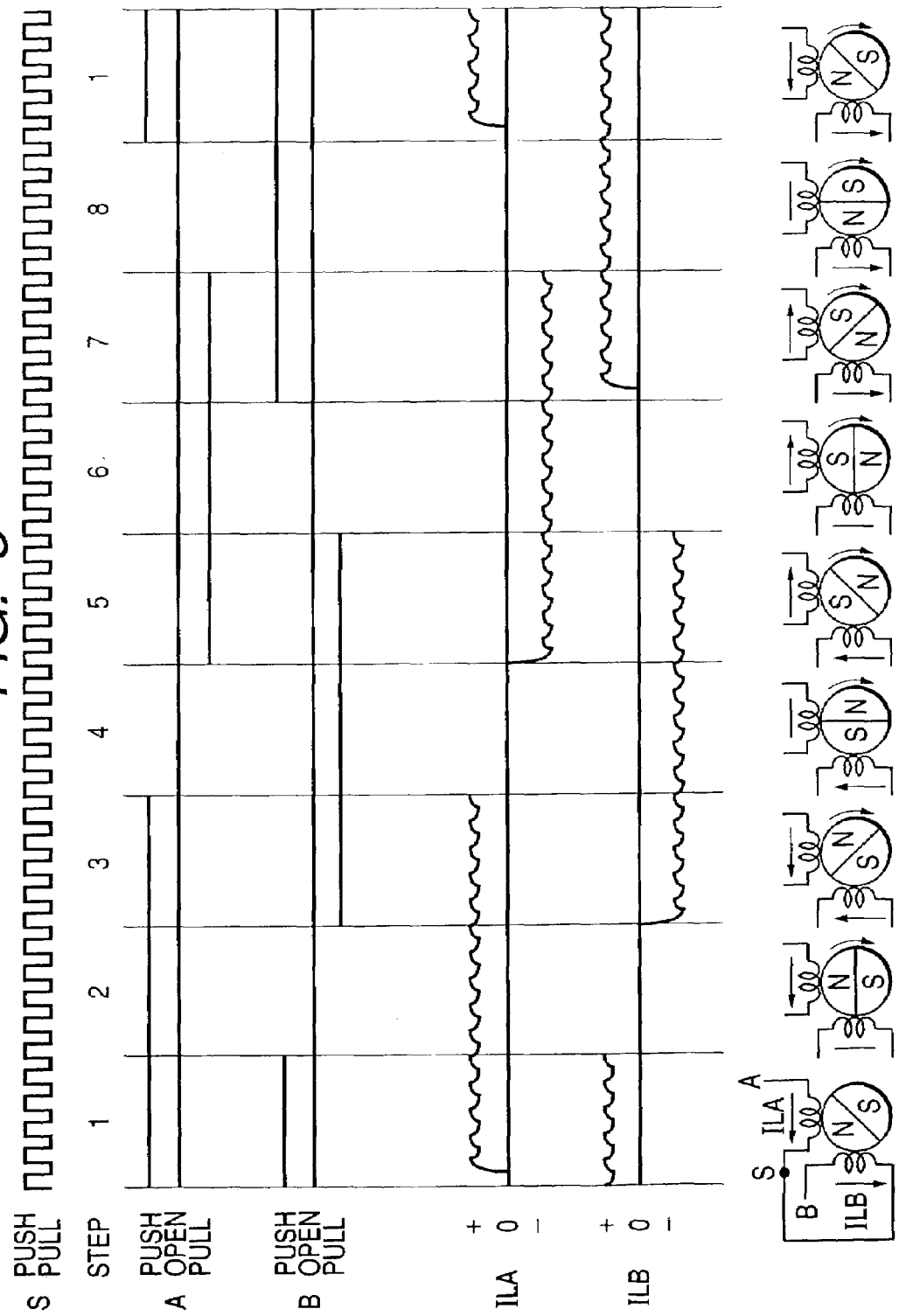
FIG. 5 is a diagram useful in explaining states of a half bridge circuit for driving a stepping motor with one-two phase excitation.

FIG. 5 is a diagram showing states of the half bridge circuit for one-two phase excitation driving. Since a driving pattern of the one-two phase excitation driving is well known, a description thereof is omitted here. Similarly to the description with reference to FIGS. 3 and 4, the state of the common terminal S is controlled so that the ratio of a period of the push state to a period of the pull state becomes 1:1. Then, the push and pull states of the terminals A and B are controlled to excite the yokes which are operatively connected to the coils LA1 and LB2, respectively, to thereby rotate the motor. A method of exciting the yokes connected to the coils LA1 and LB2 to the N pole and the S pole, respectively, is as described with reference to FIG. 4.

Next, a second embodiment of the present invention will hereinbelow be described. While the two-phase excitation driving and the one-two phase excitation driving have been described in the first embodiment, the control for micro-step driving will now be described in the present embodiment.

Figure 6:
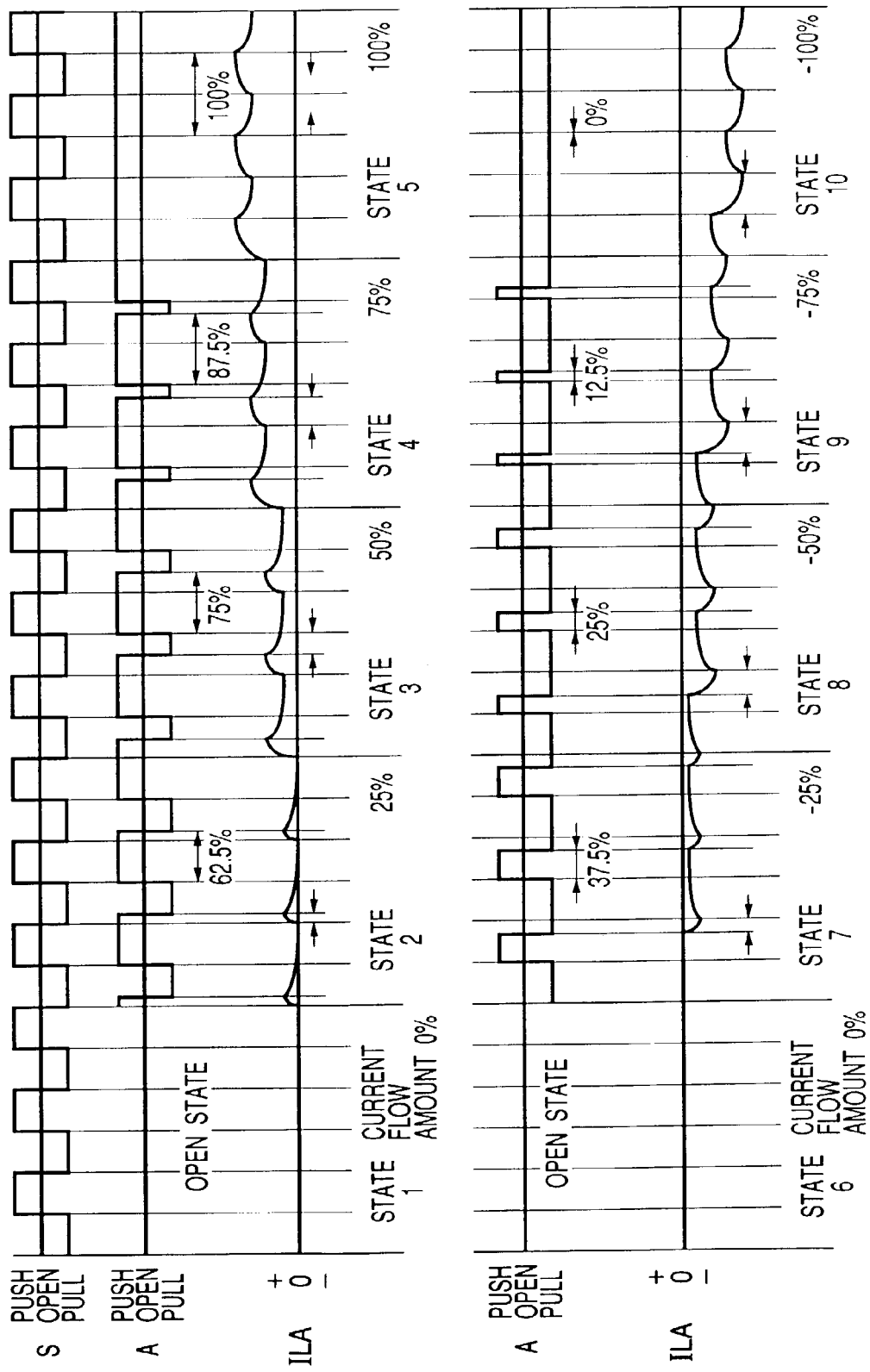
FIG. 6 is a diagram useful in explaining states of a half bridge circuit and currents caused to flow through coils in micro-step driving.

FIG. 6 is a diagram useful in explaining a state of the half bridge circuit and currents caused to flow through the coils in the micro-step driving.

A description is given by giving the coil LA1 as an example. The state of the common terminal S, similarly to the first embodiment, is controlled by the control circuit 30 so that pulses are generated in which the ratio of a period of the push state to a period of the pull state is 1:1, and the frequency thereof is fixed to about several tens kHz higher than the auditory range.

When a period of time of one push state and one pull state of the common terminal S is decided as one period, during this one period, each of the push state and the pull state are selected one time for the terminal A as well. The ratio of the push state to the pull state of the terminal A is changed with this one period as the reference, i.e., the duty ratio of the current caused to flow through the terminal A during this one period is changed to thereby carry out the micro-step driving. The duty ratio is defined here as follows:

period of time of push state/(period of time of push state +period of time of pull state)×100%

During a period of time from (state 2) to (state 5) of FIG. 6, when the terminal A is in the push state and the common terminal S is in the pull state, the current is caused to flow from the terminal A to the common terminal S to perform the charging, while when both the terminal A and the common terminal S are either in the push state or in the pull state, the discharging is performed. During a period of time from (step 7) to (step 10), when the terminal A is in the pull state and the common terminal S is in the push state, the current is caused to flow from the common terminal S to the terminal A to perform the charging, while when both the terminal A and the common terminal S are either in the push state or in the pull state, the charging is performed.

During a period of time of (state 1) and (state 6), since the terminal A is in an open state, no current is caused to flow through the coil LA1.

During a period of time of (state 5), the duty ratio is set to 100%. At this time, the charging is performed during a period of time of the first half 50% of one period, and the discharging is performed for a period of time of the last half 50%. At this time, the current flow amount caused to flow from the terminal A to the common terminal S through the coil LA1 is decided as 100%.

During a period of time of (state 10), the duty ratio is set to 0%. At this time, the charging is performed for a period of time of the last half 50% of one period, and the discharging is performed for a period of time of the first half 50% of next one period. At this time, a current flow amount caused to flow from the common terminal S to the terminal A through the coil LA1 is decided as −100%.

The coil current control in (state 1), (state 5), (state 6), and (state 10) as described above is not different from that described in the first embodiment. Next, a description will hereinbelow be given with respect to the coil current control in (state 2) to (state 4), and (state 7) to (state 9) showing characteristics of the present embodiment.

During a period of time of (state 2), the duty ratio is set to 62.5%. At this time, the charging is performed for a period of time of the first half 12.5% of one period, and the discharging is performed for a period of time of the last half 87.5%. The length of a period of time of the charging here is 25(=12.5/50) % of the length of a period of time of the charging in (state 5). Thus, repeating this cycle brings the current flow amount to be 25%, ideally.

During a period of time of (state 3), the duty ratio is set to 75%. At this time, the charging is performed for a period of time of the first half 25% of one period, and the discharging is performed for a period of time of the last half 75%. The length of a period of time of the charging here is 50(=25/50) % of the length of a period of time of the charging in (state 5). Thus, repeating this cycle brings the current flow amount to be 50%, ideally.

During a period of time of (state 4), the duty ratio is set to 87.5%. At this time, the charging is performed for a period of time of the first half 37.5% of one period, and the discharging is performed for a period of time of the last half 62.5%. The length of a period of time of the charging here is 75(=37.5/50) % of the length of a period of time of the charging in (state 5). Thus, repeating this cycle brings the current flow amount to be 75%, ideally.

During a period of time of (state 7), the duty ratio is set to 37.5%. At this time, the charging is performed for a period of time of the last half 12.5% of one period, and the discharging is performed for a period of time of the first half 87.5% of next one period. The length of a period of time of the charging here is 25(=12.5/50) % of the length of a period of time of the charging in (state 10). Thus, repeating this cycle brings the current flow amount to be −25%, ideally.

During a period of time of (state 8), the duty ratio is set to 25%. At this time, the charging is performed for a period of time of the last half 25% of one period, and the discharging is performed for a period of time of the first half 75% of next one period. The length of a period of time of the charging here is 50(=25/50) % of the length of a period of time of the charging in (state 10). Thus, repeating this cycle brings the current flow amount to be −50%, ideally.

During a period of time of (state 9), the duty ratio is set to 12.5%. At this time, the charging is performed for a period of time of the last half 37.5% of one period, and the discharging is performed for a period of time of the first half 62.5% of next one period. The length of a period of time of the charging here is 75(=37.5/50) % of the length of a period of time of the charging in (state 10). Thus, repeating this cycle brings the current flow amount to be −75%, ideally.

An amount of current ILA caused to flow through the coil LA1 for a period of time of (state 1) to (state 10) can be expressed as follows:

$$ILA = (TAPUSH/Ts - 0.5)/0.5 \times IA0$$

where Ts is a length of one period at the common terminal S, TAPUSH is a period of time of the push state of the terminal A, and IA0 is a current flowing when as for a period of time of (state 5), the terminal A is usually in the push state.

As for the terminal B, a current flow amount ILB can be similarly expressed as follows:

$$ILB = (TBPUSH/Ts - 0.5)/0.5 \times IB0$$

where TBPUSH is a period of time of the push state of the terminal B, and IB0 is a current flowing when the terminal B is usually in the push state as a period of time of (state 10).

If the control is repeatedly carried out in the order of (state 5), (state 4), (state 3), (state 2), (state 6), (state 7), (state 8), (state 9), (state 10), (state 9), (state 8), . . . for the terminals A and B, then a current flow amount caused to flow through the coil LA1 and the coil LB2 can be changed in the order of 100%, 75%, 50%, 25%, 0%, −25%, −50%, −75%, −100%, −75%, −50%, . . . stepwise.

The duty ratio is controlled every step to carry out a so-called trapezoidal wave driving to thereby realize the micro-step driving.

Table 1 shows the duty ratio (or the states) of the terminal A and the terminal B in the micro-step driving in which one circuit of an electrical angle is divided into 32 parts. Then, the duty ratio is controlled every step so that a period of time of each step is set much longer than one period of the common terminal S.

Figure 7:
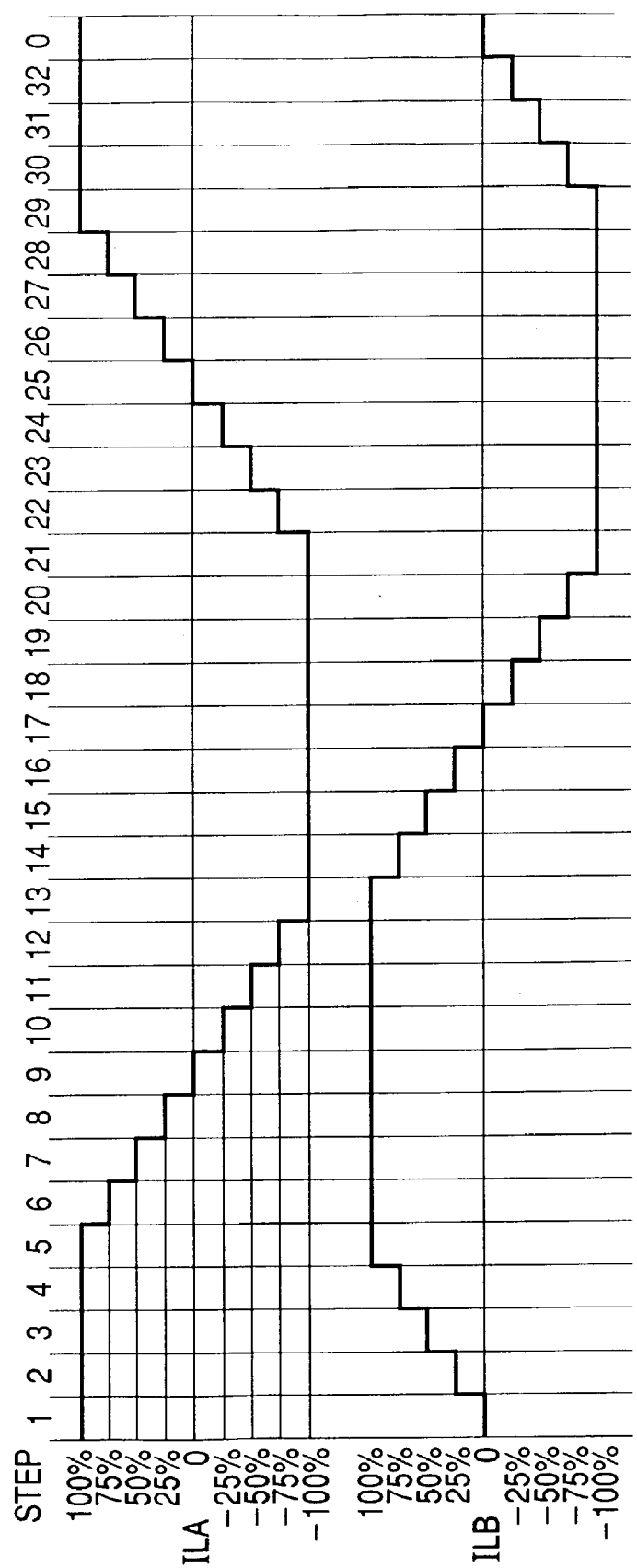
FIG. 7 is a diagram useful in explaining a current flow amount every step in micro-step driving.

FIG. 7 is a diagram showing steps and a current flow amount caused to flow through the coils LA1 and LB2 when the micro-step driving is carried out on the basis of Table 1.

Note that, in the present embodiment, while the description has been given with respect to a method of controlling the terminal A and the terminal B in the micro-step driving of 32 division, the duty ratio is changed with a finer width, whereby it is possible to realize the micro-step driving in which the number of steps is more than that of the foregoing.

In the above-mentioned first and second embodiments, the description has been given with respect to the apparatus for driving a single two-phase stepping motor. Thus, as shown in FIG. 1, while the three half bridge circuits are used in order to drive one two-phase stepping motor, when a plurality of two-phase stepping motors are driven, a half bridge circuit connected to a common terminal S of each of the stepping motors can be shared between the stepping motors.

Figure 8:
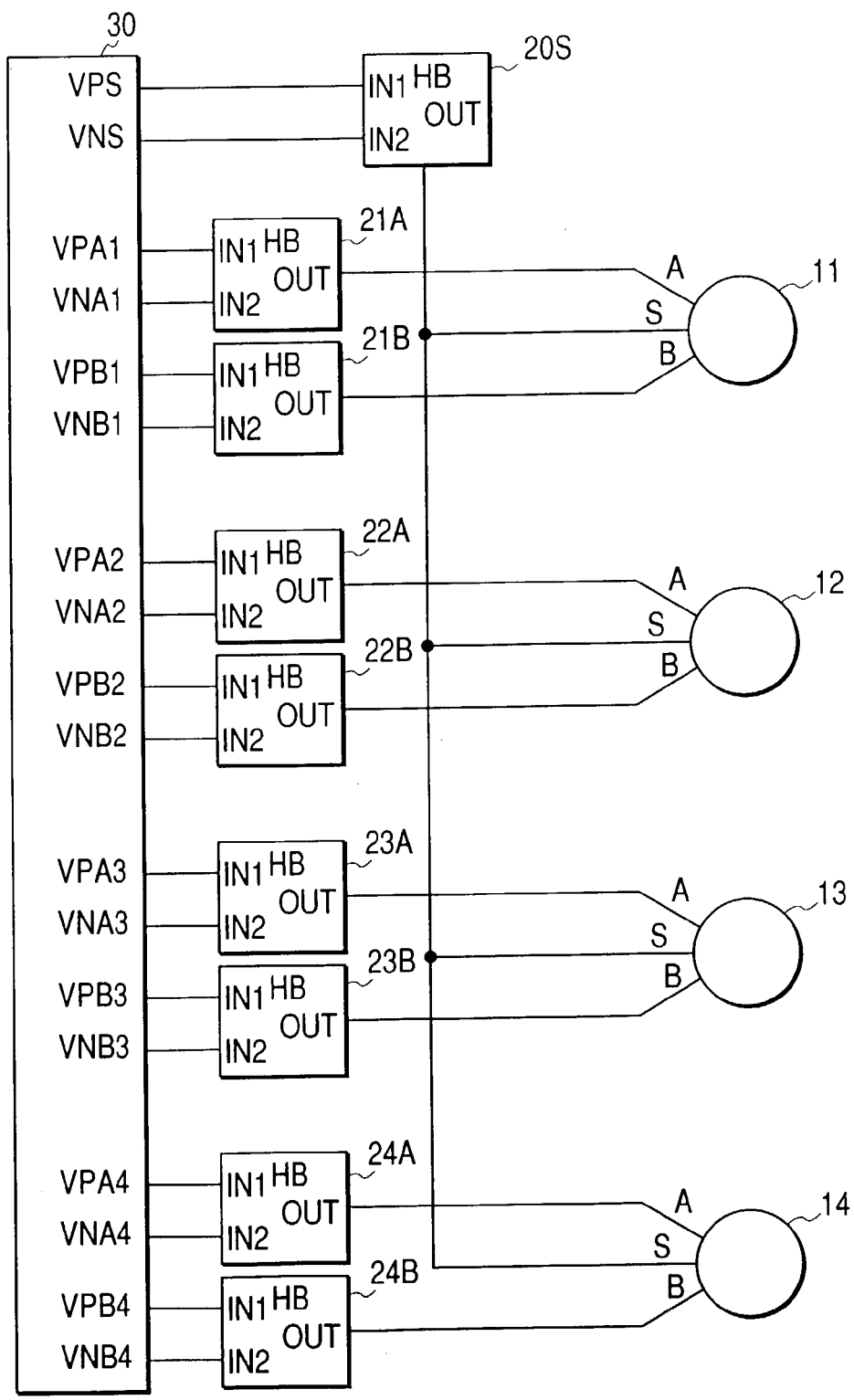
FIG. 8 is a block diagram, partly in circuit diagram, showing a configuration of an apparatus for driving a plurality of stepping motors by utilizing the bipolar driving.
Figure 9:
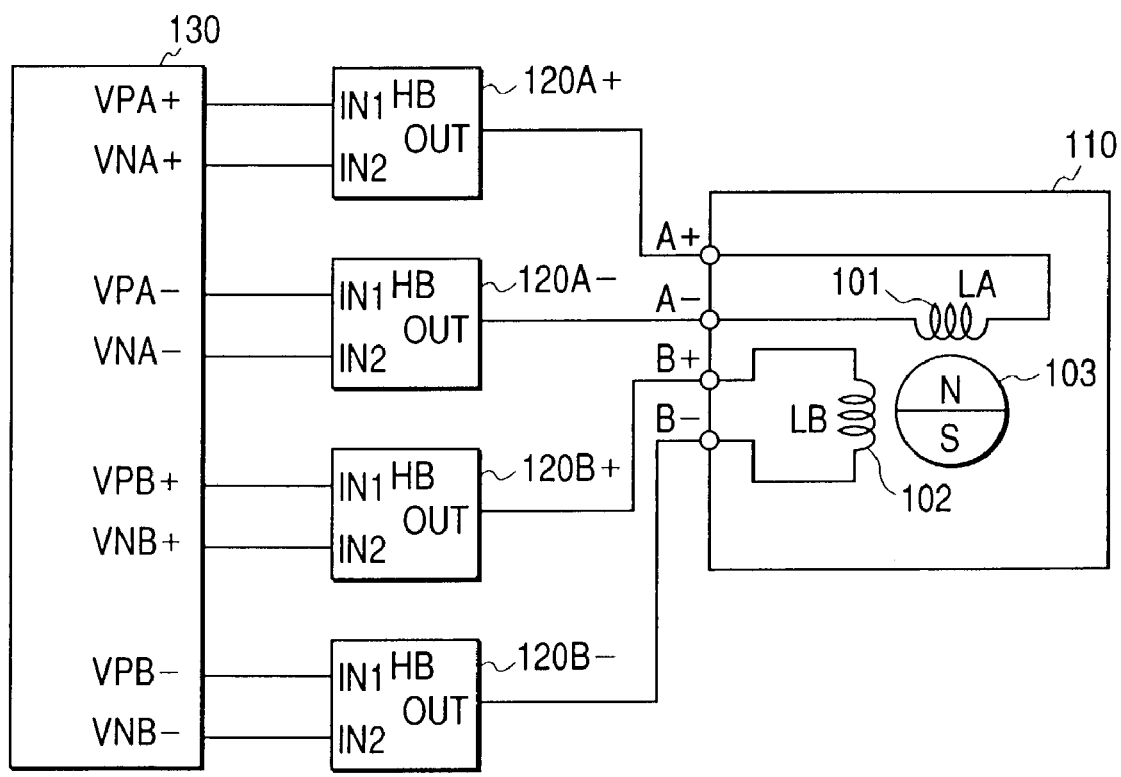
FIG. 9 is a block diagram, partly in circuit diagram, showing a configuration of an apparatus for driving a conventional stepping motor by utilizing the bipolar driving.

In a block diagram shown in FIG. 8, one half bridge circuit 20S is operatively connected to each common terminal S of four two-phase stepping motors 11, 12, 13, and 14. In the present invention, since the state of the common terminal S may be controlled with the duty ratio of 50% for any of the two-phase stepping motors, the half bridge circuit connected to the common terminal S of each of the stepping motors can be shared between the stepping motors. If the states of the terminals A and B of each of the two-phase stepping motors are controlled independently of one another, then it is possible to carry out the rotation driving which differs among the motors.

At that, while the present invention has been described by giving a two-phase stepping motor as an example, it is obvious that the present invention may also be applied to a five-phase stepping motor or the like.

TABLE 1

| Step | 1 | 2 | 3 | 4 | 5 | 6 | 7 | 8 |
|---|---|---|---|---|---|---|---|---|
| State of A | 100% | 100% | 100% | 100% | 100% | 87.5% | 75% | 62.5% |
| State of B | Open state | 62.5% | 75% | 87.5% | 100% | 100% | 100% | 100% |
| Step | 9 | 10 | 11 | 12 | 13 | 14 | 15 | 16 |
| State of A | Open state | 37.5% | 25% | 12.5% | 0% | 0% | 0% | 0% |
| State of B | 100% | 100% | 100% | 100% | 100% | 87.5% | 75% | 62.5% |
| Step | 17 | 18 | 19 | 20 | 21 | 22 | 23 | 24 |
| State of A | 0% | 0% | 0% | 0% | 0% | 12.5% | 25% | 37.5% |
| State of B | Open state | 37.5% | 25% | 12.5% | 0% | 0% | 0% | 0% |
| Step | 25 | 26 | 27 | 28 | 29 | 30 | 31 | 32 |
| State of A | Open state | 62.5% | 75% | 87.5% | 100% | 100% | 100% | 100% |
| State of B | 0% | 0% | 0% | 0% | 0% | 12.5% | 25% | 37.5% |

As set forth hereinabove, according to the above-mentioned first and second embodiments, since the common terminal to which one ends of the coils of different phases are connected is provided for the stepping motors driven by the bipolar driving, and the single half bridge circuit is operatively connected to the common terminal, it is possible to reduce the number of driving lines as well as the number of half bridge circuits.

Moreover, in the case where a plurality of stepping motors are driven, half bridge circuits which are identical in configuration to one another can be connected to the common terminal of the plurality of stepping motors to allow the driving circuit to be further reduced in scale.

While the present invention has been particularly shown and described with reference to the preferred embodiments and the specified changes thereof, it will be understood that other changes and the various modifications will occur to those skilled in the art without departing from the scope and true spirit of the invention. The scope of the invention is, therefore, to be determined solely by the appended claims.

What is claimed is:

1. A motor driving apparatus comprising;
a motor having a first coil and a second coil;
a first push-pull circuit capable of selecting a state of one of terminals of the first coil among a push state in which a current is supplied to the one of terminals, a pull state in which a current is drawn through the one of terminals, and an open state in which a current does not flow through the one of terminals;
a second push-pull circuit capable of selecting a state of one of terminals of the second coil among a push state in which a current is supplied to the one of terminals, a pull state in which a current is drawn through the one of terminals, and an open state in which a current does not flow through the one of terminals;
a common push-pull circuit to which another of terminals of the first coil and another of terminals of the second coil are connected as a common terminal, and which is capable of selecting a state of the common terminal between a push state and a pull state; and
a control circuit which controls states of the first push-pull circuit, the second push-pull circuit, and the common push-pull circuit,
wherein the control circuit controls states of the first push-pull circuit and the second push-pull circuit so as to determine flow directions of current flow into the first coil and the second coil, and
the control circuit controls the common push-pull circuit to alternately change the push state and the pull state with a period which is shorter than a period for changing the state of the first push-pull circuit and a period for changing the state of the second push-pull circuit, so that a value of current flown into the first coil and a value of current flown into the second coil are at constants; and
wherein the control circuit changes a duty ratio between a push state period and a pull state period of the first or second push-pull circuit according to an equation "period of time of push state"/("period of time of push state" +"period of time of pull state") ×100%.

in a period which is obtained by adding a push state period which is alternately performed in the common push-pull circuit to a pull state period which is alternately performed in the common push-pull circuit.

2. A motor driving apparatus according to claim 1, wherein the control circuit respectively sets currents flown into the first coil and the second coil, and performs a micro step driving by changing the values and flow directions of the respective currents in accordance with a time elapse.

* * * * *